(12) United States Patent
Mortzheim et al.

(10) Patent No.: US 6,550,253 B2
(45) Date of Patent: Apr. 22, 2003

(54) APPARATUS AND METHODS FOR CONTROLLING FLOW IN TURBOMACHINERY

(75) Inventors: Jason Paul Mortzheim, Niskayuna, NY (US); Ming Zhou, Reading, MA (US); Paul Thomas Marks, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 30 days.

(21) Appl. No.: 09/682,511

(22) Filed: Sep. 12, 2001

(65) Prior Publication Data

US 2003/0046938 A1 Mar. 13, 2003

(51) Int. Cl.$^7$ ................................................. F02C 6/08
(52) U.S. Cl. .................................... 60/782; 60/806
(58) Field of Search .......................... 60/782, 785, 806, 60/262

(56) References Cited

U.S. PATENT DOCUMENTS

| | | | | |
|---|---|---|---|---|
| 3,487,993 A | * | 1/1970 | Rannenberg | 415/28 |
| 4,182,117 A | * | 1/1980 | Exley et al. | 60/785 |
| 5,134,844 A | * | 8/1992 | Lee et al. | 60/806 |
| 6,324,828 B1 | | 12/2001 | Willis et al. | |
| 6,324,846 B1 | | 12/2001 | Clarke | |
| 6,324,848 B1 | | 12/2001 | Gladden et al. | |
| 6,325,595 B1 | | 12/2001 | Breeze-Stringfellow | |
| 6,412,270 B1 | * | 7/2002 | Mortzheim et al. | 60/782 |

\* cited by examiner

Primary Examiner—Ehud Gartenberg
(74) Attorney, Agent, or Firm—Patrick K. Patnode; Christian G. Cabou

(57) ABSTRACT

In turbomachinery, first and second flowpaths coupled to stages of the compressor flow cooling medium at different temperatures and pressures to components of the turbine. An ejector is provided in the first flowpath for suctioning flow from the second flowpath and combining the two flows for delivery to a component of the turbine at a temperature and pressure intermediate the temperature and pressure of the first and second flows. A flow sensor, flow controller and throttling valve are interposed in the motive flowpath, the exit flowpath or the suction flowpath relative to the ejector for controlling the flow through the ejector.

19 Claims, 4 Drawing Sheets

APPARATUS AND METHODS FOR CONTROLLING FLOW IN TURBOMACHINERY

BACKGROUND OF INVENTION

The present invention relates to a system for controlling flow in turbomachinery and particularly relates to a control system for ejectors used to provide cooling and/or purge flow to turbine components.

In gas turbines, a portion of the total air flow from the compressor inlet is diverted to various turbine components for various purposes, including cooling those components. The diverted air can consume a large proportion of the total air flow through the compressor, for example, as much as 20%. The management and control of these parasitic flows can dramatically increase the performance of the turbine. Typically, air under pressure is extracted from the compressor and bypasses the combustion system of the turbine for use as a cooling flow for various turbine components. Ejectors are often used for this purpose. For example, bleed air may be extracted from the thirteenth stage of the compressor for flow to the second stage nozzle to cool the nozzle. Bleed air is also extracted from another stage, for example, the ninth stage, at a lower pressure and temperature than extracted from the thirteenth stage for supplying cooling air to the third stage nozzle. The extraction ports often provide cooling air flow at too high a pressure and/or temperature and typically the flow is throttled, resulting in a net loss of energy. By employing an ejector, the low pressure/temperature flow may be mixed with the high pressure/temperature flow to provide a flow at an intermediate pressure and temperature substantially matching the pressure and temperature required to cool a turbine component, while simultaneously making use of low pressure and temperature air which otherwise might be dissipated as wasted energy.

Ejectors, however, have no moving parts and are designed for operation at specific design points based on ISO day conditions. For turbine applications, the turbine inlet conditions to the ejector are a function of ambient day conditions in which the turbomachinery operates. The ambient day variations seen by the gas turbine can vary from °F. to 120° F., which results in about a 35% temperature and about 20% pressure variation on the inlet/exit conditions to the ejector. This variation has a strong effect on the operational characteristics of the ejector to the extent that, at many ambient day conditions, the ejector will not provide adequate cooling and/or purge flow. That is, the ejector behaves differently on different days and at different times during each day. On certain days, the ejector will provided insufficient benefit or too much benefit.

SUMMARY OF INVENTION

In accordance with a preferred embodiment of the present invention, there is provided, in a cooling system having an ejector for supplying fluid at a pressure and temperature intermediate the pressure and temperature of each of first and second flows, a control system affording the capability of changing the flow characteristics of the ejector. That is, the control system hereof, in various forms, controls the primary inlet and the secondary inlet to and/or exit conditions from the ejector whereby the operating characteristics of the ejector can be controlled. Additionally, bypass piping may be included as part of the control system such that, under certain conditions, the ejector may be bypassed and the cooling flow provided under conventional turbine operating conditions. Thus, the present control system enables ejectors to be incorporated in gas turbine designs or as components for upgrades to existing turbines where they would not normally be considered due to the inherent fluctuation in flow characteristics through the ejectors, up to and including failure to deliver adequate cooling and/or purge flow, and for risk abatement or nearoperation.

More particularly, and in one form of the invention, the control system may be placed on the suction side of the ejector, the outlet side of the ejector or preferably both the suction and outlet sides of the ejector. In each case, the control system includes a control or throttling valve, a sensor, i.e., a pressure transducer, and a controller. The flow characteristics through the flow line, for example, the suction line to the ejector, are sensed by the pressure transducer and the controller controls the control/throttling valve in accordance with a compared difference between the sensed flow characteristics and predetermined flow characteristics whereby the flow is controlled. It will be appreciated that the sensed flow characteristics are a function of ambient conditions and, consequently, the control of the flow is a function of ambient conditions. An additional set of these components is preferably provided on the outlet side of the ejector as well to afford total control over the ejector and provide control which matches the sensitivity of the gas turbine. Additionally, a flow line bypassing the ejector is provided with a control valve in the bypass line. The bypass line affords the ability to override the ejector and/or supplement the cooling/purge flow for risk abatement or nearoperation.

In a second embodiment of the present invention, a similar control system comprised of a flow sensor, a throttling valve and a controller is provided on the motive and exit sides of the ejector. A bypass flowpath is also provided between the motive and exit flowpaths. In a third embodiment, the control system employs a flow sensor, a throttling valve and a flow controller on the inlet side of the ejector, with a shutoff valve on either the exit side of the ejector or the suction side of the ejector. In all of these embodiments, the operating characteristics of the ejector are controlled and accommodate the change in the ambient day conditions.

In a preferred embodiment according to the present invention, there is provided a method for controlling flow in turbomachinery, comprising the steps of establishing a first fluid flow in the turbomachinery and flowing the first fluid flow to a first site on the turbomachinery, establishing a second fluid flow in the turbomachinery at a pressure and temperature lower than the pressure and temperature of the first flow and flowing t he second fluid flow to a second site on the turbomachinery, selectively combining at least a portion of the second flow with the first flow through a crossover path to provide a third fluid flow to the first site at a pressure and temperature intermediate the pressure and temperature of the first and second flows, respectively, sensing a characteristic of the flow through the crossover path and controlling the flow through the crossover path in accordance with the sensed flow characteristics of the flow through the crossover path.

In a further preferred embodiment according to the present invention, there is provided a method for controlling flow in turbomachinery, comprising the steps of establishing a first fluid flow in the turbomachinery and flowing the first fluid flow to a first site on the turbomachinery, establishing a second fluid flow in the turbomachinery at a pressure and temperature lower than the pressure and temperature of the first flow and flowing the second fluid flow to a second site on the turbomachinery, selectively combining at least a portion of the second flow with the first flow through a crossover path to provide a third fluid flow to the first site at a pressure and temperature intermediate the pressure and temperature of the first and second flows, respectively, sensing a characteristic of the combined flow to the first site and controlling the combined flow to the first site in accordance with the sensed characteristics of the combined flow.

In a further preferred embodiment according to the present invention, there is provided a method for controlling flow in turbomachinery, comprising the steps of establishing a first fluid flow in the turbomachinery and flowing the first fluid flow to a first site on the turbomachinery, establishing a second fluid flow in the turbomachinery at a pressure and temperature lower than the pressure and temperature of the first flow and flowing the second fluid flow to a second site on the turbomachinery, selectively combining at least a portion of the second flow with the first flow through a crossover path to provide a third fluid flow to the first site at a pressure and temperature intermediate the pressure and temperature of the first and second flows, respectively, sensing a characteristic of the first fluid flow before combining the first flow and second flow portion and controlling the first flow in accordance with the sensed flow characteristics of the first flow before combining the first flow and the second flow portion.

In a further preferred embodiment according to the present invention, there is provided a system for bleeding air from plural ports in a multicompressor to provide cooling and/or sealing air to an associated turbine site for optimizing turbine performance, comprising a first extraction port for extracting a first flow from a pressure stage of the compressor for flow along a first flowpath, a second extraction port for extracting a second flow from another pressure stage of the compressor for flow along a second flowpath and at a pressure and temperature lower than the pressure and temperature of the first flow, a first crossover flowpath interconnecting the first flow along the first flowpath and the second flow along the second flowpath to provide a crossover flow therebetween, an ejector having an inlet for receiving the first flow along the flowpath and a second inlet for receiving the crossover flow from the second flowpath, a mixer and a diffuser for respectively combining the first flow and crossover flow to provide a third combined flow along a third flowpath, a control valve for controlling the flow through one of the first flowpaths, the crossover flowpath and said third flowpath, a sensor for sensing a characteristic of one of the first, second and third flows and a controller for controlling the flow through the control valve in accordance with the sensed flow characteristic of the one flow enabling the combined first and crossover flows for flow to a first site of the turbine at a pressure and temperature intermediate the temperature and pressure of the first and second flows.

DETAILED DESCRIPTION

Figure 1:
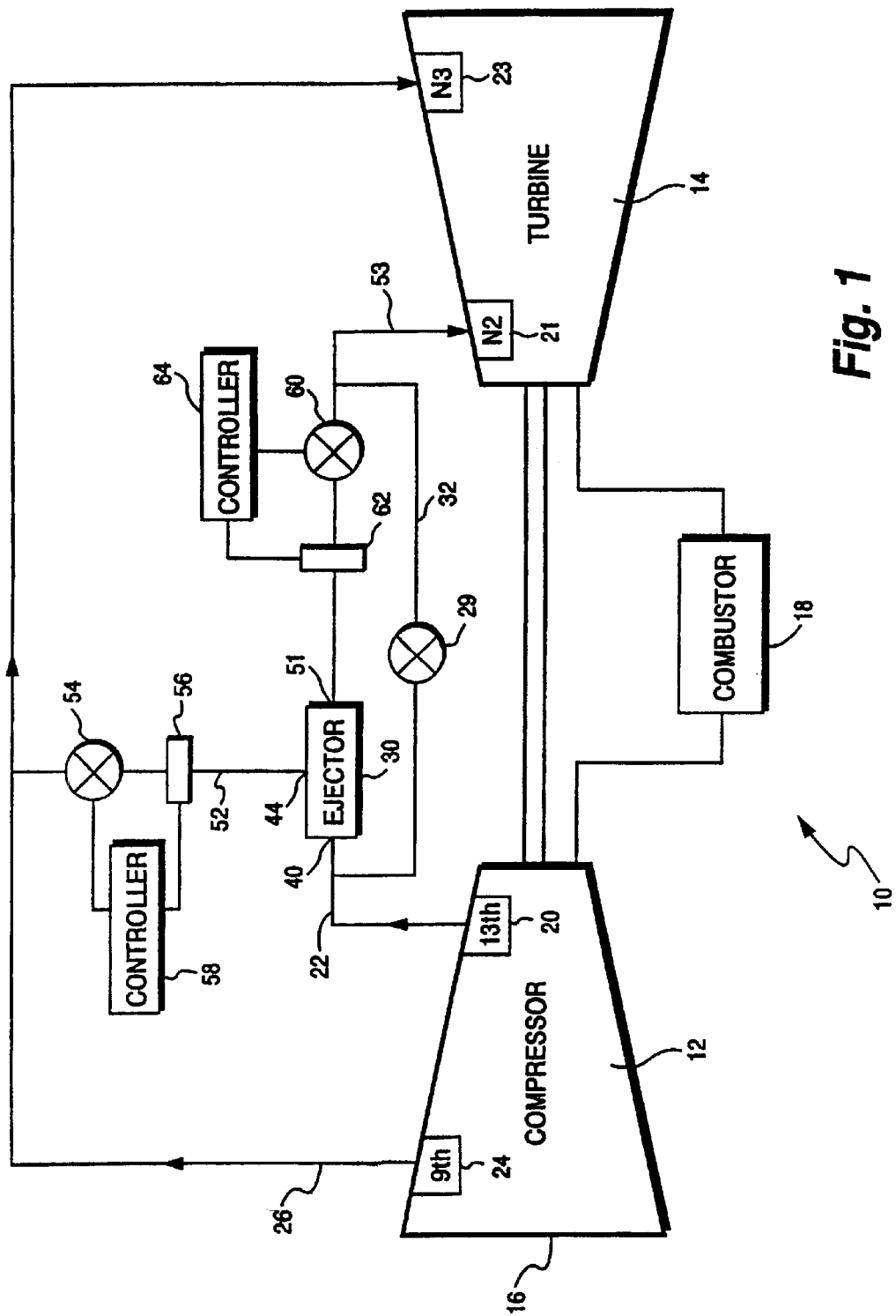
FIG. 1 is a schematic illustration of compressor and turbine sections of turbomachinery employing controlled fluid cooling/purge flow circuits in accordance with a preferred embodiment of the present invention.

Referring now to the drawings, particularly to FIG. 1, there is illustrated turbomachinery, generally designated 10, including a compressor 12 and a turbine 14. As typical, the compressor 12 has an inlet 16 for receiving ambient air which is then compressed through a number of different stages of the turbomachinery, each compressing the air to higher pressures and temperatures. The compressed air is primarily for delivery to combustors 18 where the pressurized air is combined with fuel and combusted to provide hot gases of combustion to the various stages of the turbine 14. Bleed air is typically removed from various stages of the compressor for use as cooling/purge air flow in the turbine. Thus, a portion of the compressor air flow is diverted from flow through the combustors 18 for these other purposes. For example, cooling air is often provided to the nozzles of the turbine. In FIG. 1, and as a representative example, a high pressure air extraction is taken from the thirteenth stage 20 of compressor 12 and provided as cooling air flow to a first site 21 of the turbine, e.g., a second stage nozzle N2, via a flowpath 22. Similarly, bleed air is extracted from an earlier stage, e.g., the ninth stage 24 of compressor 12, and supplied via flowpath 26 as cooling air to a second site 23 of the turbine, e.g., a third stage nozzle N3. A throttling valve 29 is provided in a bypass flowpath 32 in the flowpath 22 for purposes explained below.

Figure 2:
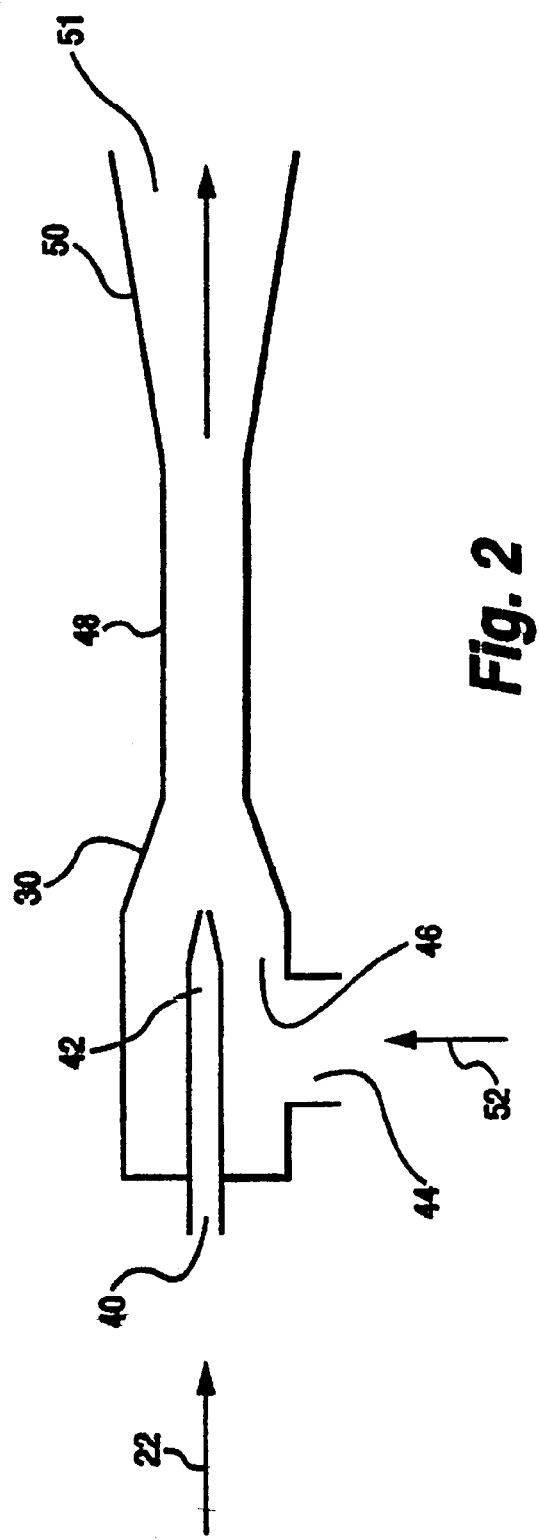
FIG. 2 is a schematic illustration of an ejector.

An ejector 30 is employed in flowpath 22 which effectively eliminates the need to dissipate bleed air pressure across an orifice or similar device in flowpath 26 and enables mixing of bleed air from flowpaths 22 and 26 to adjust extraction flows to optimize machine performance. An ejector as illustrated in FIG. 2 is a mechanical device with no moving parts or required external energy input which mixes two fluid streams based on a momentum transfer. As illustrated in FIG. 2, the ejector has an inlet 40 for the high pressure motive fluid received via line 22, a primary nozzle 42, an inlet 44 for the low pressure or suction fluid received via a flowpath 52, a secondary nozzle 46 for accelerating the secondary flow to drop its static pressure, the primary nozzle 42 being used to lower the static pressure of the motive flow to a pressure below the total pressure of the suction flow, a mixing tube 48 for mixing the two flows and a diffuser 50 for decelerating the mixed flow and regaining static pressure.

By locating the injector 30 in the flowpath 22, the high pressure extraction flow from the thirteenth stage 20 of the compressor serves as the motive flow at inlet 40. The lower pressure, lower temperature flow via flowpath 26 flows to the ejector via a crossover flowpath 52 and serves as the suction flow via inlet 44. Thus, the two flows are mixed together and flow through the outlet 51 of the ejector 30 forming a third flow 53 (FIG. 1) at a pressure and temperature intermediate the pressure and temperature of the respective motive and suction flows. It will be appreciated that the ejector, therefore, has no moving parts and is designed to operate at a specified design point based on ISO day conditions. Because the inlet conditions and hence the characteristics of the flows supplied the ejector are a function of ambient day conditions, the operational characteristics of the ejector are effected and the ejector behaves differently as a function of time.

In accordance with a preferred embodiment of the present invention, the flow characteristics of the ejector are controlled as a function of varying inlet conditions, i.e., ambient conditions. Particularly, the operating characteristics of the ejector can be controlled, in a first embodiment hereof, by controlling the secondary inlet and exit conditions to the ejector. To accomplish this, the crossover flowpath 52 is provided, upstream of the ejector 30, with a control/throttling valve 54, a sensor 56 which may comprise a pressure transducer and a controller 58 which may comprise a proportional integrated derivative controller. The sensor 56 thus senses a flow characteristic in crossover flowpath 52, e.g., pressure, and provides a signal to the controller proportional to that sensed pressure. The controller compares the sensed flow characteristic with predetermined flow characteristics used as a criteria for controlling the valve 54 and, hence, the flow characteristics in crossover path 52. The flow characteristics criteria are based on ambient conditions and the signal to the valve 54 is a function of the difference between the sensed flow characteristic and the predetermined flow characteristics, i.e., a function of ambient conditions.

Similarly, a control may be located in the flowpath 22 downstream of the ejector 30. Thus, a control valve 60, a flow sensor 62 and a controller 64 may be disposed in flowpath 22 downstream of ejector 30 and upstream of the target site in the turbine, i.e., nozzle N2. It will be appreciated that the flow characteristics of the combined flow from the flowpaths 22 and 26 are controlled and hence a controlled appropriate flow of cooling air is provided the downstream component.

As an exemplary illustration of the operation of the control system hereof, the ambient conditions during operation may drop below the ISO day temperature. In that event, the pressure in the nozzle N2 increases, which increases the backpressure at the ejector outlet 51. This reduces the ratio of entrained suction flow and motive flow. The sensor 56, however, senses the flow in crossover flowpath 52 and the controller compares the sensed pressure with predetermined flow characteristics and adjusts the flow through the ejector 30 by adjusting throttle valve 54. Similarly, the sensor 62 on the outlet side of the ejector may sense the increased backpressure and controller 64 compares the sensed pressure with predetermined flow characteristics and adjusts the flow through the ejector by adjusting throttle valve 60. If the backpressure exceeds the point where the ejector will no longer entrain any suction flow, the controller 64 may close down the ejector and the operation reverts to a conventional system using bypass 32. In the event the ambient day temperature increases beyond the ISO day conditions, the pressure at nozzle N2 drops and the entrainment ratio of suction flow to motive flow increases. In addition, however, the extractions from the ninth and thirteenth stages change as well. Thus, the ejector 30 may pull excessive flow rates and cause a performance penalty. The sensors 56 and/or 62 sense the flow rates and adjust the valves 54 and 60 accordingly to accommodate the increased ISO day condition.

Figure 3:
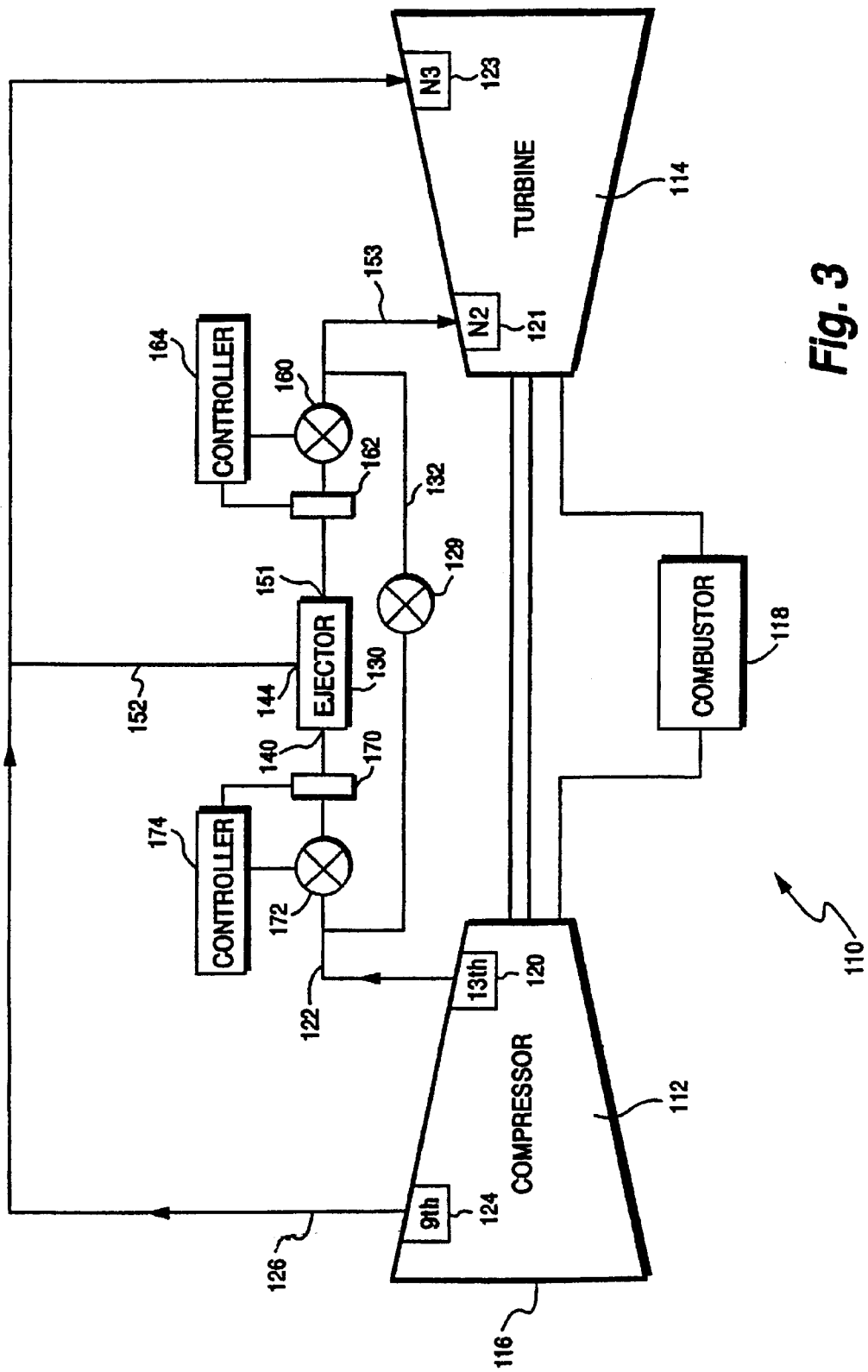
FIGS. 3 and 4 are schematic illustrations similar to FIG. 1 of additional embodiments of the present invention.

Referring now to FIG. 3 illustrating an alternative embodiment, wherein like reference numerals are applied to like parts, preceded by the prefix 1, the same control is used on the discharge side of the ejector, i.e., valve 160, sensor 162 and controller 164. However, in addition, the motive pressure on the inlet side of the ejector 130 is provided with a similar control system. Thus, as illustrated in FIG. 3, a sensor 170, a throttle valve 172 and a controller 174 are provided in flowpath 122 on the inlet side of ejector 130. The control system on the suction side, as illustrated in FIG. 1, is entirely eliminated. Consequently, by sensing the pressures on the inlet and outlet sides of the ejector on the motive and exit flowpaths, the interambient changes can be dynamically controlled. Additionally, the embodiment illustrated in FIG. 3 enables a failsafe return to the system which does not employ ejectors via the bypass flowpath.

Figure 4:
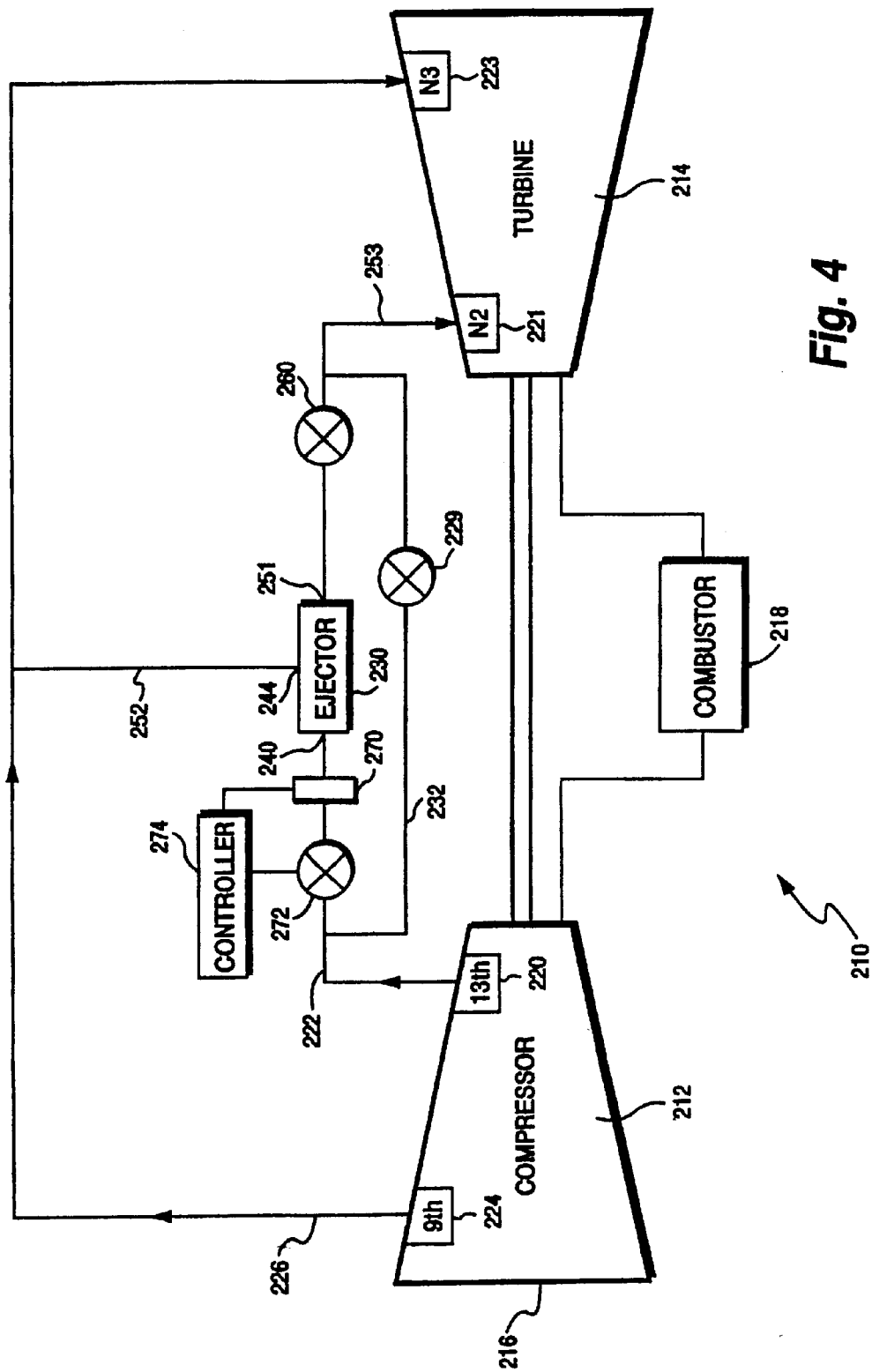

A still further embodiment is illustrated in FIG. 4, wherein like reference numerals are applied to like parts, preceded by the prefix 2. In this system, a similar control system is provided on the inlet side of the ejector. Thus, a flow sensor 270, a throttle valve 272 and a controller 274 are provided in the inlet flowpath 222. In lieu of a control system on the ejector outlet side or on its suction side, a shutoff valve may be provided either on the exit or suction side to shut off the ejector flow entirely.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling flow in turbomachinery, comprising the steps of:

establishing a first fluid flow in the turbomachinery and flowing the first fluid flow to a first site on the turbomachinery;

establishing a second fluid flow in the turbomachinery at a pressure and temperature lower than the pressure and temperature of the first flow and flowing the second fluid flow to a second site on the turbomachinery;

selectively combining at least a portion of the second flow with said first flow through a crossover path to provide a third fluid flow to said first site at a pressure and temperature intermediate the pressure and temperature of said first and second flows, respectively;

sensing a characteristic of the flow through the crossover path; and controlling the flow through the crossover path in accordance with the sensed flow characteristics of the flow through the crossover path.

2. A method according to claim 1 including sensing a characteristic of the combined flow to the first site and controlling the combined flow to the first site in accordance with the sensed characteristics of the combined flow.

3. A method according to claim 1 wherein the step of combining includes accelerating the first flow, suctioning the second flow portion by passing the first flow in proximity thereto for mixing with the first flow and passing the combined flow through a diffuser to form said third flow.

4. A method according to claim 1 wherein the sensed flow characteristic is a function of ambient conditions, and controlling the flow through the crossover path in accordance with the ambient conditions.

5. A method according to claim 1 including establishing predetermined flow characteristics as criteria for the second flow, comparing the sensed and predetermined flow characteristics and controlling the flow through the crossover path in accordance with the compared sensed and predetermined flow characteristics.

6. A method according to claim 1 wherein the step of establishing a first flow includes extracting the first flow from a stage of a compressor forming part of the turbomachinery, the step of establishing a second flow including extracting the second flow from another stage of the compressor at a pressure and temperature lower than the pressure and temperature of the first extracted flow, respectively.

7. A method for controlling flow in turbomachinery, comprising the steps of:

establishing a first fluid flow in the turbomachinery and flowing the first fluid flow to a first site on the turbomachinery;

establishing a second fluid flow in the turbomachinery at a pressure and temperature lower than the pressure and temperature of the first flow and flowing the second fluid flow to a second site on the turbomachinery;

selectively combining at least a portion of the second flow with said first flow through a crossover path to provide a third fluid flow to said first site at a pressure and temperature intermediate the pressure and temperature of said first and second flows, respectively;

sensing a characteristic of the first fluid flow before combining the first flow and second flow portion; and controlling the first flow in accordance with the sensed flow characteristics of the first flow before combining the first flow and second flow portion.

8. A method according to claim 7 wherein the step of combining includes accelerating the first flow, suctioning the second flow by passing the first flow in proximity thereto for mixing with the first flow and passing the combined flow through a diffuser to form said third flow.

9. A method according to claim 7 wherein the sensed flow characteristic is a function of ambient conditions, and controlling the flow in accordance with the ambient conditions.

10. A method according to claim 7 including establishing predetermined flow characteristics as criteria for the combined flow, comparing the sensed and predetermined flow characteristics and controlling the flow to the first site in accordance with the compared sensed and predetermined flow characteristics.

11. A method according to claim 7 wherein the step of establishing a first flow includes extracting the first flow from a stage of a compressor forming part of the turbomachinery, the step of establishing a second flow including extracting the second flow from another stage of the compressor at a pressure and temperature lower than the pressure and temperature of the first extracted flow, respectively.

12. A method for controlling flow in turbomachinery, comprising the steps of:

establishing a first fluid flow in the turbomachinery and flowing the first fluid flow to a first site on the turbomachinery;

establishing a second fluid flow in the turbomachinery at a pressure and temperature lower than the pressure and temperature of the first flow and flowing the second fluid flow to a second site on the turbomachinery;

selectively combining at least a portion of the second flow with said first flow through a crossover path to provide a third fluid flow to said first site at a pressure and temperature intermediate the pressure and temperature of said first and second flows, respectively;

sensing a characteristic of the first fluid flow before combining the first flow and second flow portion; and controlling the first flow in accordance with the sensed flow characteristics of the first flow before combining the first flow and the second flow portion.

13. A method according to claim 12 wherein the step of combining includes accelerating the first flow, suctioning the second flow portion by passing the first flow in proximity thereto for mixing with the first flow and passing the combined flow through a diffuser to form said third flow.

14. A method according to claim 12 wherein the sensed flow characteristic is a function of ambient conditions, and controlling the first flow before combining the first flow and the second flow portion in accordance with the ambient conditions.

15. A method according to claim 12 wherein the step of establishing a first flow includes extracting the first flow from a stage of a compressor forming part of the turbomachinery, the step of establishing a second flow including extracting the second flow from another stage of the compressor at a pressure and temperature lower than the pressure and temperature of the first extracted flow, respectively.

16. A system for bleeding air from plural ports in a multicompressor to provide cooling and/or sealing air to an associated turbine site for optimizing turbine performance, comprising:

a first extraction port for extracting a first flow from a pressure stage of the compressor for flow along a first flowpath;

a second extraction port for extracting a second flow from another pressure stage of the compressor for flow along a second flowpath and at a pressure and temperature lower than the pressure and temperature of the first flow;

a first crossover flowpath interconnecting said first flow along said first flowpath and said second flow along said second flowpath to provide a crossover flow therebetween;

an ejector having an inlet for receiving the first flow along said flowpath and a second inlet for receiving the crossover flow from the second flowpath, a mixer and a diffuser for respectively combining the first flow and crossover flow to provide a third combined flow along a third flowpath;

a control valve for controlling the flow through one of said first flowpaths, said crossover flowpath and said third flowpath;

a sensor for sensing a characteristic of one of the first, second and third flows; and a controller for controlling the flow through the control valve in accordance with the sensed flow characteristic of the one flow enabling the combined first and crossover flows for flow to a first site of the turbine at a pressure and temperature intermediate the temperature and pressure of the first and second flows.

17. A system according to claim 16 wherein the control valve, sensor and controller are located in the first flowpath.

18. A system according to claim 16 wherein the control valve, sensor and controller are located in the crossover flowpath.

19. A system according to claim 16 wherein the control valve, sensor and controller and located in the third flowpath.

* * * * *